United States Patent
Bernhardt et al.

(10) Patent No.: US 6,869,355 B2
(45) Date of Patent: Mar. 22, 2005

(54) APPARATUS AND METHOD FOR DETERMINING GRAIN LOSS IN COMBINE HARVESTERS

(75) Inventors: Gerd Bernhardt, Bannewitz/OT Hänichen (DE); Ralf Hübner, Dresden (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 30 days.

(21) Appl. No.: 10/322,927

(22) Filed: Dec. 18, 2002

(65) Prior Publication Data
US 2003/0199291 A1 Oct. 23, 2003

(30) Foreign Application Priority Data
Dec. 18, 2001 (DE) .......................................... 101 62 354

(51) Int. Cl.[7] ............................................... A01F 12/00
(52) U.S. Cl. ................... 460/4; 460/79; 460/1
(58) Field of Search ................ 460/4, 1, 79; 56/10.2 R

(56) References Cited

U.S. PATENT DOCUMENTS

| | | | |
|---|---|---|---|
| 4,360,998 A | * | 11/1982 | Somes ........................... 460/5 |
| 4,933,589 A | | 6/1990 | Strubbe |
| 5,015,997 A | | 5/1991 | Strubbe |
| 5,775,072 A | | 7/1998 | Herlitzius et al. |
| 6,205,384 B1 | | 3/2001 | Diekhans |
| 6,315,658 B1 | | 11/2001 | Weber |

FOREIGN PATENT DOCUMENTS

| | | |
|---|---|---|
| DE | 198 00 238 | 8/1999 |
| DE | 199 21 466 | 11/2000 |
| EP | 0 728 409 | 8/1996 |

* cited by examiner

Primary Examiner—Meredith Petravick
(74) Attorney, Agent, or Firm—Husch & Eppenberger, LLC; Robert C. Haldiman; David A. Chambers

(57) ABSTRACT

An apparatus and method for determining grain loss of a harvesting machine. The harvesting machine has a crop-separating region with separating members. The separating members each have separation sensors for generating a signal corresponding to the crop quantity separated. This signal is delivered to an evaluating unit for further processing. Processing includes determining a separation curve for at least some of the separating zones and converting the separation curve to a characteristic quantity. From this measured characteristic quantity, a loss is determined based on a characteristic curve deposited in the evaluating unit. By avoiding direct loss measurement on the harvesting machine, the negative crop-related effects on determining grain loss are considerably reduced.

20 Claims, 4 Drawing Sheets

APPARATUS AND METHOD FOR DETERMINING GRAIN LOSS IN COMBINE HARVESTERS

BACKGROUND OF THE INVENTION

The present invention relates generally to agricultural machinery, especially self-propelled harvesting machines and, more particularly, to a method and an apparatus for measuring grain loss.

DESCRIPTION OF THE RELATED ART

A method for measuring grain loss is disclosed in EP 0 728 409. An agricultural harvesting machine having separating members constructed as separating sieves is disclosed. Separation sensors are located on the lower section of the separating member for measuring the grain separated. An evaluating unit processes the measured data from the separation sensors to determine the separation curve. With this measured separation curve, the effectiveness of the separating members is estimated. However, this method does not determine the grain loss of the harvesting machine.

U.S. Pat. No. 5,015,997 describes a method for determining grain loss of agricultural harvesting machines. The method uses conventional separation sensors mounted behind the separating members for generating measurement signals. The measurement signals are for grain loss for the entire harvesting machine or for the sensed working member. Generally, the separation sensors are either a pulse pick-up or vibration pick-up type. These types of separation sensors depend on the properties of the crop creating. For example, the measurements fluctuate considerably during one day of harvesting because of the change in moisture requiring frequent calibration of the separation sensors. Another disadvantage is that these separation sensors detect the actually separated components of the crop stream. Consequently, the crop stream may have grain not separated from the harvested crop, which will have an effect on the measurements of the separation sensors resulting in an inaccurate determination of the actual grain loss.

SUMMARY OF THE INVENTION

It is therefore an aspect of the invention to make determinations of grain loss to a large extent independently of the crop properties, so that frequent calibration of the measuring system is not necessary with the same crop species.

In another aspect of the invention, there is a method for dividing the crop separating region having at least one separating member in the separating zones to avoid direct measurement of grain loss on the harvesting machine, for measuring the efficiency of the separating zones, for converting the mean efficiency value to a characteristic quantity, and for determining grain loss curve via an evaluating unit. This method is advantageous because the negative crop-related effects on grain loss determinations are considerably reduced. In particular, the calibration frequency of the measuring system is reduced or eliminated. Further, the distribution of the grains representing the loss in the crop layer exiting the combine harvester no longer play a role, as the real losses are no longer measured explicitly, but determined indirectly by means of the characteristic quantity according to the invention.

In still another aspect of the invention, there is an apparatus having a structurally simple design including at least one working member and at least one separation sensor. The separation sensors are operatively connected to an evaluating unit via a data transmission system. The separation sensors divide the crop-separating region into separating zones. The separating zones are separated from one another and a line of demarcation is effected mechanically by dividing webs, through software in the evaluating unit, or combination thereof.

The above aspects are merely illustrative and should not be construed as all-inclusive. The aspects should not be construed as limiting the scope of the invention, rather the scope of the invention is detailed in the appended claims.

BRIEF DESCRIPTION OF THE DRAWINGS

Reference is now made to the drawings which illustrate the best presently known mode of carrying out the invention and wherein similar reference characters indicate the same parts throughout the views:

FIG. 2a is a detailed view of a threshing cylinder and separation sensors shown in FIG. 2;

DETAILED DESCRIPTION

Figure 1:
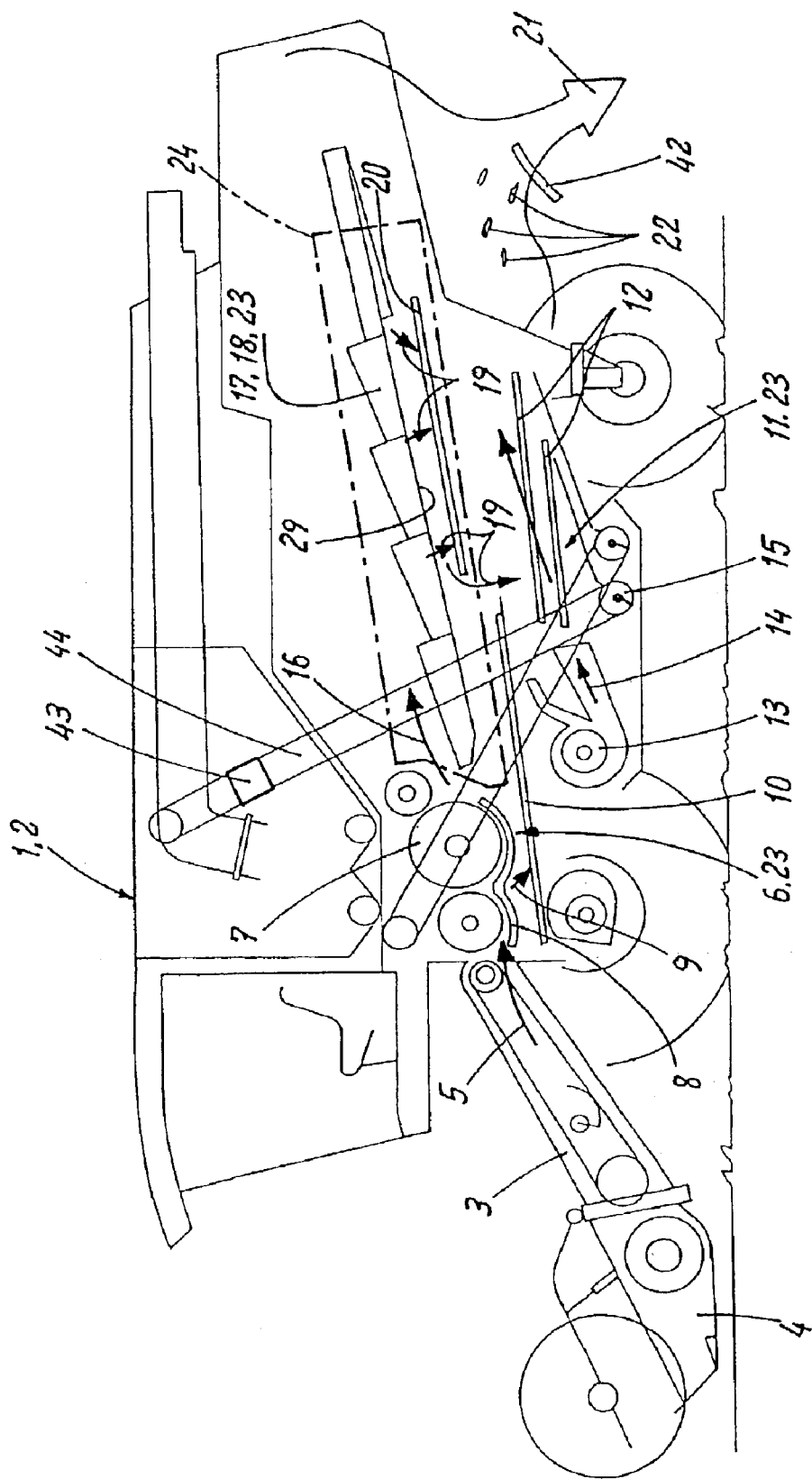
FIG. 1 is a side view of a combine harvester.

FIG. 1 shows an agricultural harvesting machine 1 designed as a combine harvester 2 having a front-mounted feed rake 3 for transferring harvested crop from a front attachment 4 to a threshing mechanism 6 in a crop string 5. The crop string 5 is transported from the through the threshing mechanism 6 between at least one rotating threshing cylinders 7, concaves and separating grates 8. The kernels, grains or fruits are threshed and separated from the stalks, chaff, cobs or the like during processing through the threshing cylinders 7, concaves and separating grates 8. The kernels, grains or fruits along with short straw and chaff are separated from the stalks, chaff, cobs and large straw into a first crop stream 9, and delivered to a grain pan 10 located below the concaves and the separating grates 8. The grain pan 10 has vibrating sieves for moving the first crop stream 9 into a cleaning device 11. In the cleaning device 11, blowers 13 generate air currents 14 to separate the short straw and chaff from the kernels, grains or fruits. While the non-grain components or short straw and chaff are blown out of the harvesting machine 1 via the air current 14, the cleaned kernels, grains or fruits are transported out of the cleaning device 11 by feed augers 15.

A second crop stream 16 is delivered to a grain-straw separator 17 designed as a rack-type straw walker 18. During the movement of the second crop stream 16 on the grain-straw separator 17, a third crop stream 19 is produced as a portion of the second crop stream 16 is separated by the grain-straw separator 17. The third crop stream 19 contains kernels, grains, fruits, short straw and chaff. The third crop stream 19 is passed into the cleaning device 11 via an inclined return pan 20 arranged below the rack-type straw walker 18. As explained above, the kernels, grains and fruits are separated from the non-grain components in the cleaning device 11.

In a rear region of the combine harvester 2, the chaff, straw, cob and other unusable fractions from the first, second and third crop streams 9, 16, 19, respectively, are spewed into a discharge stream 21 from the combine harvester 2. The discharge stream 21 has a small fraction of grain 22, which is grain loss.

The threshing mechanism 6, the grain-straw separator 17 and the cleaning device 11 form separating members 23 for separating kernels, grains or fruits in the crop streams 9, 16, 19, so that each of the separating members 23 may be responsible for grain losses. Consequently, the embodiment described below with the example of the threshing device 6 and the rack-type straw walker 18 can also be used in the same way on the cleaning device 11 or on only one of these separating members 23 to obtain the effects described. In an alternative embodiment, the combine harvesters 2 has an axial-separation rotor 24 instead of the rack-type straw walker 18. In another alternative embodiment, the combine harvester 2 has threshing and separation rotors instead of the threshing mechanism 6 and the grain-straw separator 17.

To be able to precisely determine the efficiency of separation of the harvesting machine 1, it is an advantage if a crop-separating region of the at least one working member is divided into separating zones adjoining each other and associated with each separating zone is a separation sensor for generating a signal corresponding to the crop quantity separated. The more separation sensors arranged in a separating zone, the higher the accuracy of the separation efficiency value of the respective separating zone.

Figure 2:
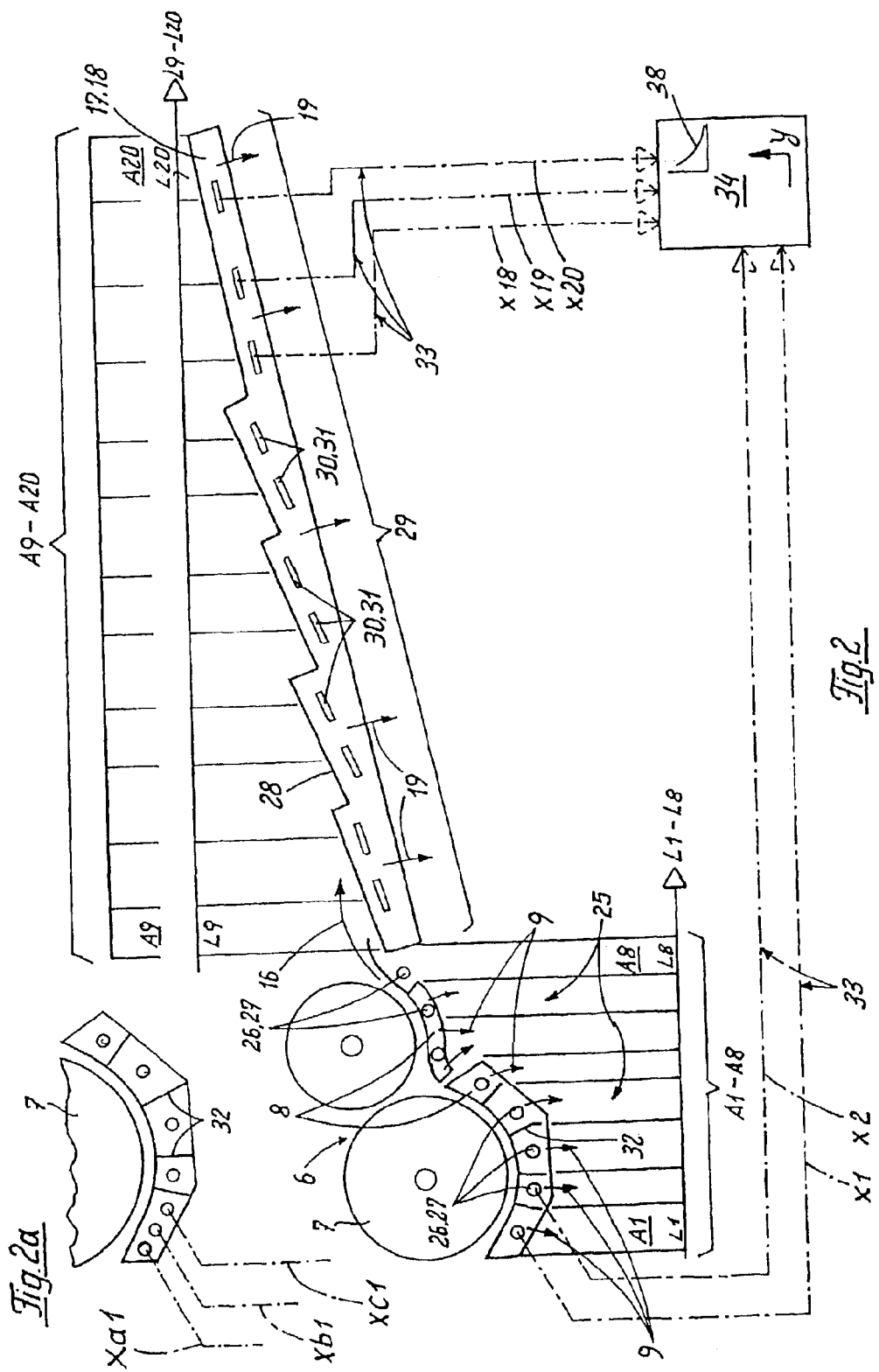
FIG. 2 is an isolated view of the threshing components, separation components and evaluation unit of the combine harvester according to FIG. 1.

FIG. 2 shows the threshing device 6 and the rack-type straw walker 18. A plurality of separation sensors 26 are associated with the concaves and the separating grates 8 in a crop-separating region 25. In one embodiment, the separation sensors 26 are rod sensors 27, and the rod sensors 27 extend substantially across the width of the threshing device 6. When the first crop stream 9 passes through the threshing device 6, the kernels, grains or fruits are separated, and the separation sensors 26 are contacted and/or sense the quantity of grain contained in the first crop stream 9. The kernels, grains or fruits come in contact with the separation sensors 26, and the sound generated in the process is used to determine the quantity of kernels, grains or fruits separated. The separation sensors 26 are also referred to as so-called "knock sensors."

Further, the rack-type straw walker 18 have a plurality of separation sensors 30 below a separating surface 28 in a crop-separating region 29. In one embodiment, the separation sensors 30 are rod sensors 31, and the rod sensors 31 extend across substantially the width of the grain-straw separator 17. As the third crop stream 19 passes through the rack-type straw walker 18, the kernels, grains or fruits impinge on the separation sensors 30, 31 resulting in sound, wherein the sound is a signal which is used to determine the quantity of separated grains.

Separating zones A1–A20 are associated with each separation sensor 26, 30, wherein adjacent separating zones A1–A20 in some regions do not overlap. In the embodiment shown, the separating zones A1–A8 are spatially demarcated from each other mechanically by transverse webs 32. By contrast, the separating zones A9–A20 of the rack-type straw walker 18 do not have mechanical means for demarcation of the individual separating zones A9–A20 from each other. The demarcation of the separating zones A9–A20 from each other is predetermined by software. It is within the scope of the invention that the manner of demarcation of the separating zones A1–A20 from each other is completely free and, in departure from the embodiment shown here, can be effected exclusively mechanically or by software or in any combined form.

The signals X1–X20 generated in the separation sensors 26, 30 and corresponding to the crop quantity separated are transmitted via a suitable data transmission system 33 to an evaluating unit 34. For reasons of simplification, the data transmission system 33 is shown only for selected separation sensors 26, 30 in FIG. 2. In alternative embodiments, the data transmission system 33 is made of wires or of wireless transmission paths.

If the signals of the separation sensors 26, 30 transmitted to the evaluating unit 34 are first converted for each separating zone to a separation efficiency value of this respective separating zone, an easy conversion of the signals generated by the separation sensors 26, 30 is achieved. This is achieved by averaging, wherein the separation efficiency value is determined by integration of the separation curve within the respective separating zone A1–A20 and results from the ratio between the crop quantity separated over the respective separating zone and the crop quantity to be separated which is delivered to this separating zone.

Determination of a loss value corresponding to the instantaneous conditions of separation is considerably simplified if the separation efficiency values of at least some of the separating zones A1–A20 are converted in the evaluating unit 34 to a single separation efficiency value, which then forms the characteristic quantity according to the invention for determining the loss of the harvesting machine 1.

Figure 3:
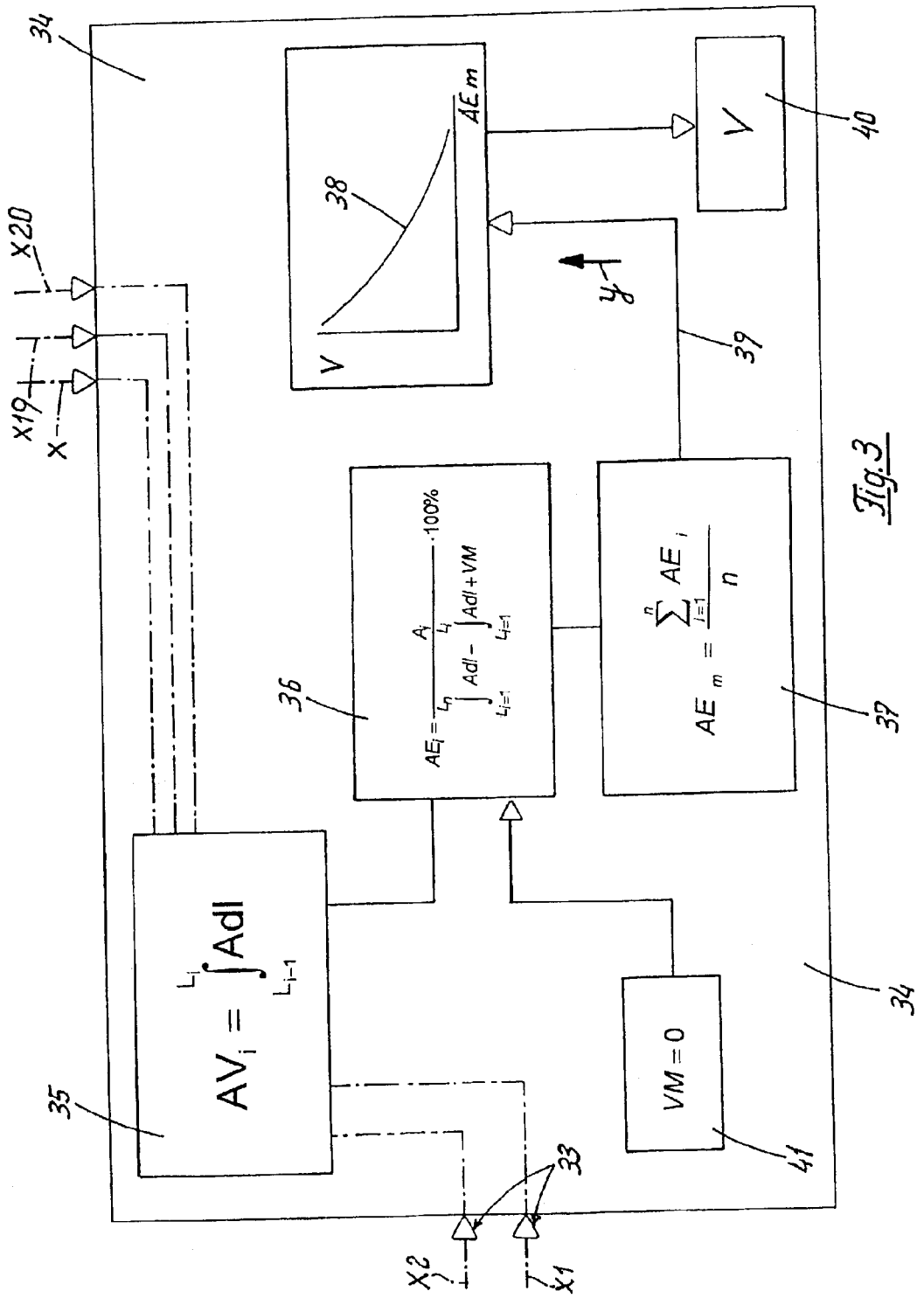
FIG. 3 is a functional diagram of the evaluating unit shown in FIG. 1.
Figure 4:
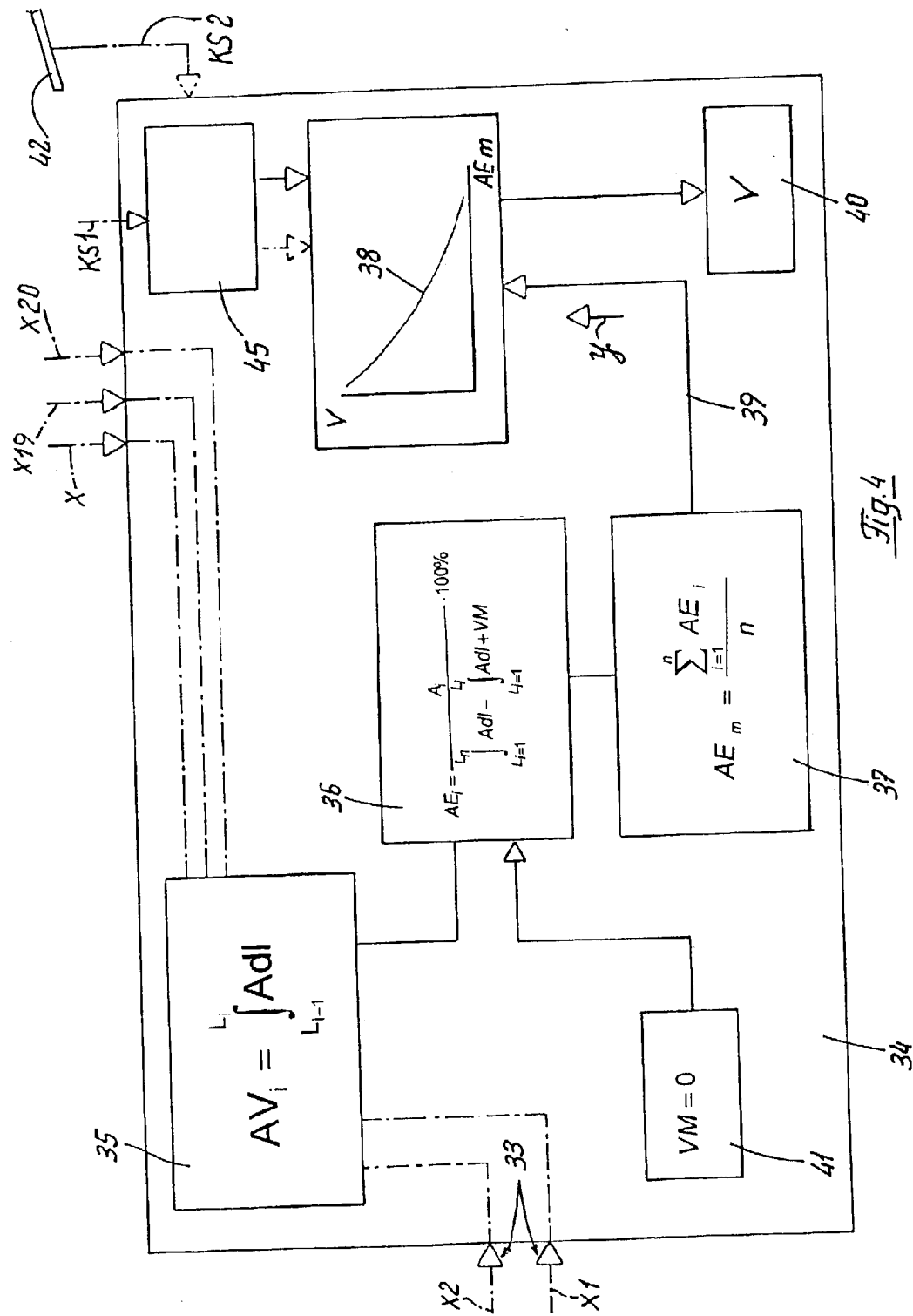
FIG. 4 is a functional diagram of an alternative embodiment of the evaluating unit.

As shown in FIG. 3, the signals X1–X20 corresponding to the crop quantity separated are converted as in computing step 35 to separation curves AV1–AV20 by integrating the sensed separations X1–X20 of a separating zone A1–A20 over the length L1–L20 of the separating zone A1–A20. In a second computing step 36, a separation efficiency value AE1–AE20 is determined, which forms a ratio value between the crop stream 19 separated in the respective separating zone A1–A20 and the crop quantity to be separated which is delivered to this separating zone A1–A20, in the practical example the grains. In a third computing step 37, these separation efficiency values AE1–AE20 are combined in the evaluating unit 34 into a mean separation efficiency value AEm. A characteristic curve 38 is plotted between a particular loss value V on the y-axis and a particular mean separation efficiency value AEm on the x-axis in the evaluating unit 34. In other words, the characteristic curve 38 deposited in the evaluating unit 34 represents the grain loss as a function of a mean separation efficiency value. In a mathematical step 39, a specific loss value V of the deposited characteristic curve 38 is assigned to the calculated mean separation efficiency value AEm and made displayed on a display 40. Thus, the calculated mean separation efficiency AEm forms the characteristic quantity Y to be determined from the individual separation efficiency values AE1–AE20, for which quantity there is deposited in the evaluating unit 34 the characteristic curve 38 which shows a specific loss value V for the characteristic quantity Y determined.

In an advantageous development of the invention, the method is considerably simplified above all by the fact that the crop quantity which is not separated over the last separating zone in the direction of crop discharge and which forms the loss mass is ignored, and complete separation in this last separating zone is assumed. Hence, the method becomes completely independent of frequent sensor detection of the loss of the harvesting machine 1. Thus, it is assumed that the quantity of grains delivered to the last separating zone A20 of the rack-type straw walker 18 is completely separated thereon, so that the grain loss mass VM ignored in this way and is equal to 0 according to block diagram 41.

It is further within the scope of the invention that associated with the separating zones A1–A20 or with some of the separating zones A1–A20 is several separation sensors 26, 30 whose signals Xa1–Xc1 are first converted to separation curves AV1–AV20 according to the first computing step 35 of the evaluating unit 34. In order that the method can be employed flexibly and to improve accuracy, several characteristic curves 38 can also be deposited in the evaluating unit 34 as a function of various crop-specific parameters, wherein the crop species and moisture fraction of the crop are the most important crop-specific parameters.

In an advantageous development of the invention, the characteristic curves 38 deposited in the evaluating unit 34 are variable, or further characteristic curves 38 can be added to the evaluating unit 34. A particularly simple way of varying the characteristic curves 38 arises if the signals of the separation sensors 26, 30 corresponding to the crop quantity separated are converted to mean separation efficiency values in the evaluating unit as a function of different crop throughputs, wherein associated with the mean separation efficiency values are in each case loss values of a particular throughput, which then form the pair of values of the characteristic curve to be newly generated. In that way, the driver of the harvesting machine 1 can provide new characteristic curves. At its simplest, this is made possible by the driver of the harvesting machine 1 picking up crop quantities defined over a given length of time by means of the front attachment 4. The discharge stream 21 leaving the rear region of the combine harvester 2 is in this case transported above grain loss sensors 42 known in the art. The grains 22 emerging from the discharge stream 21 generate signals KS2 corresponding to the grain mass in the grain loss sensors 42. Also, the combine harvester 2 has a grain quantity sensor mechanism 43 which at its simplest is arranged in at least one grain elevator 44 of the combine harvester 2, which generates a signal KS1 corresponding to the total grain quantity harvested by the combine harvester 2. In a first computing step 45, a loss value V is determined from these signals KS1, KS2, which corresponds to the respective grain quantities. The loss value V is then deposited as a new or further characteristic curve 38 in the evaluating unit 34 as a function of the characteristic quantities Y. In an advantageous development of the invention, these loss values can be either determined on the harvesting machine 1 itself or picked up separately by the latter and deposited in the evaluating unit 34. Thus, it is within the scope of the invention that the loss values V can also be deposited in the evaluating unit 34 without having been determined in and by the harvesting machine 1 itself.

Other aspects, objects and advantages of the present invention can be obtained from a study of the drawings, the disclosure and the accompanying claims. The invention in its broader aspects is not limited to the specific steps and apparatus shown and described but departures may be made therefrom within the scope of the accompanying claims without departing from the principles of the invention and without sacrificing its chief advantages.

What is claimed is:

1. A method for determining grain loss of a harvesting machine having a crop-separating region with a separating member, comprising the steps of:

dividing the crop-separating region into separating zones;

generating a signal corresponding to crop quantity separated for each separating zone;

delivering the generated signal to an evaluating unit for further processing;

determining a separation curve for at least some of the separating zones;

converting the separation curves to a mean separation efficiency value;

comparing the mean separation efficiency value to a characteristic curve in the evaluating unit; and displaying the loss corresponding to the measured mean separation efficiency value.

2. A method for determining grain loss of a harvesting machine having a crop-separating region with a separating member, comprising the steps of:

dividing the crop-separating region into separating zones;

generating a signal corresponding to crop quantity separated for each separating zone;

delivering the generated signal to an evaluating unit for further processing;

determining a separation curve for at least some of the separating zones;

converting the separation curve to a characteristic quantity;

comparing the characteristic quantity to a characteristic curve in the evaluating unit;

displaying the loss corresponding to the measured characteristic quantity;

precluding detection of crop loss in a last separating zone; and assuming complete separation in the last separating zone.

3. The method for determining grain loss of a harvesting machine according to claim 1, further comprising the step of determining the quantity of grain separated in each of the separating zones.

4. A method for determining grain loss of a harvesting machine having a crop-separating region with a separating member, comprising the steps of:

dividing the crop-separating region into separating zones;

generating a signal corresponding to crop quantity separated for each separating zone;

delivering the generated signal to an evaluating unit for further processing;

determining a separation curve for at least some of the separating zones;

converting the separation curve to a characteristic quantity;

comparing the characteristic quantity to a characteristic curve in the evaluating unit; and displaying the loss corresponding to the measured characteristic quantity.

5. The method for determining grain loss of a harvesting machine according to claim 4, further comprising the step of determining the separation efficiency value by taking the ratio of the crop quantity separated over the crop quantity which is to be delivered to the separating zone.

6. The method for determining grain loss of a harvesting machine according to claim 5, further comprising the step of using the characteristic quantity as the mean value of the separation efficiency values for at least some of the separating zones.

7. A method for determining grain loss of a harvesting machine having a crop-separating region with a separating member, comprising the steps of:

dividing the crop-separating region into separating zones;

generating a signal corresponding to crop quantity separated for each separating zone;

delivering the generated signal to an evaluating unit for further processing;

determining a separation curve for at least some of the separating zones;

converting the separation curve to a characteristic quantity;

comparing the characteristic quantity to a characteristic curve in the evaluating unit; and displaying the loss corresponding to the measured characteristic quantity;

wherein the characteristic curve deposited in the evaluating unit represents the grain loss as a function of a mean separation efficiency value.

8. The method for determining grain loss of a harvesting machine according to claim 7, further comprising the step of choosing the characteristic curve based on crop-specific parameters.

9. The method for determining grain loss of a harvesting machine according to claim 8, wherein the crop-specific parameters are crop species and crop moisture.

10. A method for determining grain loss of a harvesting machine having a crop-separating region with a separating member, comprising the steps of:

dividing the crop-separating region into separating zones;

generating a signal corresponding to crop quantity separated for each separating zone;

delivering the generated signal to an evaluating unit for further processing;

determining a separation curve for at least some of the separating zones;

converting the separation curve to a characteristic quantity;

comparing the characteristic quantity to a characteristic curve in the evaluating unit; and displaying the loss corresponding to the measured characteristic quantity;

wherein the evaluating unit includes a plurality of characteristic curves.

11. The method for determining grain loss of a harvesting machine according to claim 10, further comprising the step of varying the characteristic curves deposited in the evaluating unit.

12. The method for determining grain loss of a harvesting machine according to claim 11, further comprising the step of generating characteristic curves by determining loss values and corresponding mean separation efficiency values based on a known throughput, the characteristic curves vary according to the known throughput.

13. The method for determining the grain loss of a harvesting machine according to claim 12, further comprising the steps of:

determining loss values associated with the mean separation efficiency values on the harvesting machine; and depositing the loss values and the mean separation efficiency values in the evaluating unit.

14. An apparatus for determining grain loss of a harvesting machine, comprising:

a crop-separating region divided into separation zones and having a working member;

each separating zone having a separation sensor said separation sensor sensing a crop quantity separated; and an evaluating unit operatively connected to the separation sensors by a data transmission system, said evaluating unit being configured to determine a separation curve for at least some of the separating zones;

convert the separation curves to a mean separation efficiency value;

compare the mean separation efficiency value to a characteristic curve in the evaluating unit; and display the loss corresponding to the measured characteristic quantity.

15. The apparatus for determining grain loss of a harvesting machine according to claim 14, including at least one stationary dividing elements for demarcating the separating zones.

16. The apparatus for determining grain loss of a harvesting machine according to claim 14, including a software module in the evaluating unit configured to demarcate the separating zones.

17. The apparatus for determining grain loss of a harvesting machine according to claim 14, wherein the separating sensor includes a rod sensor.

18. The apparatus for determining grain loss of a harvesting machine according to claim 14, wherein an axial-separation rotor separates the grain.

19. The apparatus for determining grain loss of a harvesting machine according to claim 14, wherein a straw walker separates the grain.

20. An apparatus for determining grain loss of a harvesting machine, comprising;

a plurality of crop-separating regions;

each of the crop-separating regions have a working member and is divided into a plurality of separating zones;

each of the separating zone have a separating sensor;

at least one demarcation element configured to demarcate the separating zones; and an evaluating unit operatively connected to the separation sensors by a data transmission system, said evaluating unit being configured to determine a separation curve for at lest some of the separating zones;

convert the separation curves to a mean separation efficiency value;

compare the mean separation efficiency value to a characteristic curve in the evaluating unit; and display the loss corresponding to the measured mean separation efficiency value.

* * * * *